UNITED STATES PATENT OFFICE.

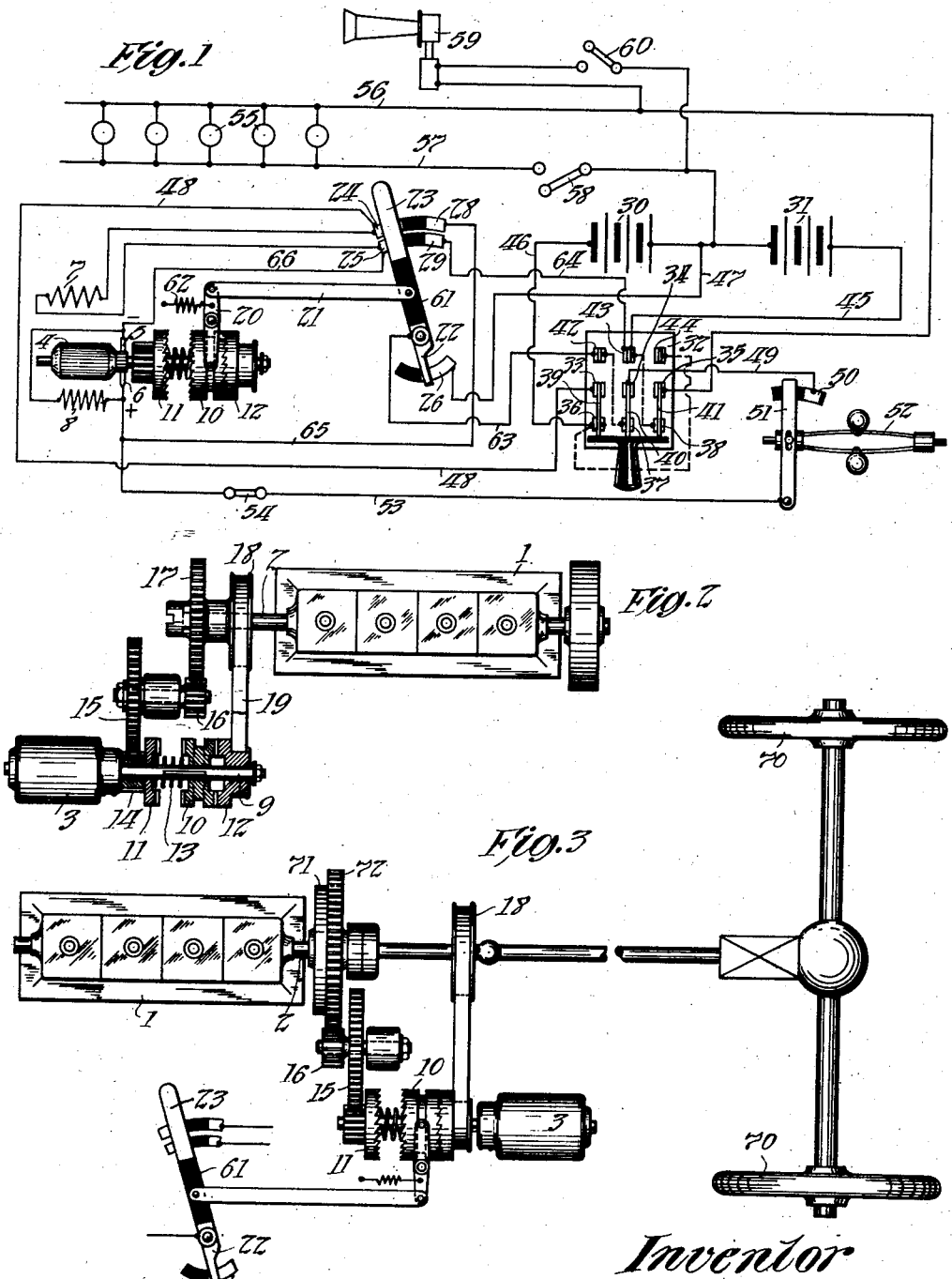

THOMAS A. EDISON, OF WEST ORANGE, NEW JERSEY.

STARTING AND CURRENT-SUPPLYING SYSTEM FOR AUTOMOBILES.

1,255,517. Specification of Letters Patent. Patented Feb. 5, 1918.

Application filed July 31, 1912. Serial No. 712,391.

*To all whom it may concern:*

Be it known that I, THOMAS A. EDISON, a citizen of the United States, and a resident of Llewellyn Park, West Orange, Essex county, New Jersey, have invented certain new and useful Improvements in Starting and Current-Supplying Systems for Automobiles, of which the following is a description.

My invention relates to starting and current supplying systems for automobiles driven by internal combustion engines. The object of my invention is to provide simple and efficient means for starting the internal combustion engine and for supplying current to the lighting, ignition, signal, and other circuits. In my improved system, I employ a single dynamo electric machine capable of operating as a motor or as a generator and preferably having series characteristics when operating as a motor and shunt characteristics when operating as a generator. Power transmission mechanism is provided for operatively connecting the dynamo electric machine to the engine so that the dynamo electric machine may drive the engine to start the same when desired, or for operatively connecting the dynamo electric machine to the engine so that the dynamo electric machine may be driven by the engine and operate as a generator. When the dynamo electric machine is connected to drive the engine to start the same, the speed ratio of the machine to the engine is preferably greatly reduced, so as to enable the dynamo electric machine when operating as a motor, to exert a greatly increased torque upon the engine for starting it. I also provide a storage battery, preferably divided into two sections, each having the same number of cells, and connections and circuit changing means, whereby current may be supplied from the entire battery to the dynamo electric machine to operate the same as a motor to start the engine, or whereby either section of the battery may be charged by the dynamo electric machine operating as a generator. In my improved system, the lighting circuit is preferably connected to the section of the battery which is not being charged, in order that the lamps may be free from any injurious effects due to fluctuations in the generator voltage. Other circuits, such as ignition or signal circuits, may be operated from the whole or any desired portion of the battery. In some aspects my present invention is an improvement on that described and claimed in my prior application Serial No. 699,110, filed May 23, 1912, in which I described and claimed a somewhat similar system employing an electric motor declutchably connected to the crank shaft of the internal combustion engine through greatly reduced gearing, so that when the motor is driven at a high speed from the storage battery, a large torque is exerted upon the crank shaft of the engine to start the same, and a generator which is driven by the engine and serves to charge either half of a storage battery to which it may be connected by a suitable switch, the lighting circuit being fed from the half of the battery which is not being charged, and the other circuits, such as the ignition and signal circuits, being fed from the whole or suitable portions of the battery.

Other features and objects of my invention will appear in the further description of my invention, in which reference is had to the drawings accompanying and forming a part of this specification, and in which:

Figure 1 is a view partly diagrammatic showing one embodiment of my improved system;

Fig. 2 is a plan view partly in section showing a portion of the mechanism; and

Fig. 3 is a plan view partly diagrammatic, showing a modified arrangement of the mechanism.

Referring to the drawings, and particularly to Figs. 1 and 2, at 1 is shown an internal combustion engine having a crank shaft 2. At 3 is shown a dynamo electric machine capable of operating either as a motor or as a generator and having an armature 4 provided with commutator brushes 5 and 6, a series field winding 7, and a shunt field winding 8. The shunt field winding 8 is connected directly across the brushes 5 and 6. The armature shaft 9 is provided with a clutch member 10 keyed to the shaft 9 but capable of axial movement thereon. Loosely mounted on the armature shaft 9 are clutch members 11 and 12, with either of which the clutch member 10 is adapted to coöperate. The clutch member 10 is biased by the spring 13 to coöperate normally with the clutch member 12, but may be moved into position to coöperate with the clutch member 11. When the dynamo electric machine 3 operates as a motor, the clutch member 10 is caused to engage and drive the clutch member 11, and suitable power transmission mechanism is provided between the clutch member 11 and the crank shaft of the engine, in order to cause the engine to be started. The power transmission mechanism is so designed that the speed ratio of the dynamo electric machine operating as a motor to the engine is very small, whereby the dynamo electric machine operating as a motor is enabled to exert a greatly increased torque upon the engine to start the same. In the power transmission mechanism illustrated the clutch member 11 is provided with a small gear wheel 14 secured thereto, which coöperates with and is adapted to drive a large gear wheel 15 which has secured to its shaft a small gear wheel 16 which coöperates with and is adapted to drive a large gear wheel 17 secured to the crank shaft of the internal combustion engine 1. By this or similar means, a motor of relatively small torque is enabled to exert a large torque upon the crank shaft of the engine. When the clutch member 10 coöperates with the clutch member 12, the dynamo electric machine 3 is connected through suitable power transmission mechanism to the crank shaft of the engine and is driven thereby. In the power transmission mechanism illustrated, the crank shaft of the engine is provided with a pulley 18 which drives the belt 19, which in turn drives a pulley secured to the clutch member 12. When the dynamo electric machine is driven as a generator by the engine, the power transmission mechanism employed is preferably so designed that the speeds of the engine and the dynamo electric machine do not differ greatly. Means is provided for shifting the clutch member 10 into engagement with the clutch member 11, and the structure illustrated for this purpose includes a pivoted fork member 20, the forked end of which engages with the clutch member 10 and the other end of which is connected to a link 21, the link 21 being connected to a pivoted lever 61. A spring 62 is secured to the pivoted member 20 and assists the spring 13 in holding the clutch controlling mechanism in the position in which the clutch member 10 engages the clutch member 12. When the lever 61 is moved a predetermined amount about its pivot against the action of the spring 62, the clutch member 10 is caused to engage clutch member 11. The lever 61 is provided at its lower end with a contact segment 22 and at its upper end with a contact segment 23. In the position to which the lever 61 is normally biased, the contact segment 23 serves to connect together fixed contact segments 24 and 25 to which the terminals of the series winding 7 are connected. Contact segment 25 is connected by a conductor 66 to commutator brush 5. In the position to which the lever 61 is normally biased, the series winding 7 is short circuited through contact segments 24, 23, and 25, and the contact segment 22 mounted on the lever 61 is in contact with a fixed contact segment 26. When the lever 61 is thrown into the position in which the clutch member 10 engages the clutch member 11, the contact segment 23 coöperates with fixed contact segments 28 and 29 to connect these contact segments together, and contact between contact segments 22 and 26 is broken, the contact segment 22 having moved off the contact segment 26. The lever 61 is preferably arranged to be manually or pedally controlled by the operator. At 30 and 31 are shown two sections of a storage battery, each consisting preferably of the same number of cells, and connections and circuit changing means, such as the switch 32, are provided for connecting the whole of the battery to the dynamo electric machine to operate the same as a motor or for connecting one of the battery sections to the dynamo electric machine operating as a generator to be charged therefrom, and the lighting circuit to the other section of the battery. The switch 32 includes contacts 33, 34 and 35 which are adapted to be connected to contacts 36, 37 and 38 respectively by switch blades 39, 40 and 41 respectively. The switch blades are preferably provided with a common operating handle, and the connections described are made when the switch is in the position illustrated. When the switch is thrown into its other circuit closing position, the contacts 33, 34 and 35 are connected to contacts 42, 43 and 44 respectively by the switch blades 39, 40 and 41 respectively. Contacts 42, 43 and 44 are permanently connected to contacts 37, 38 and 36 respectively by suitable conductors. The right hand terminal of battery section 31 is connected through conductor 45 to switch contact 43, and the left hand terminal of battery section 30 is connected through conductor 46 to switch contact 36. The right hand terminal of battery section 30 is connected to the left hand terminal of battery section 31, the point of connection constituting the middle point of the entire battery. This middle point is connected through conductor 47 to contact segment 26 previously mentioned. Lever contact segment 22, which coöperates with contact segment 26 when the lever 61 is in its normally biased position, is connected through conductor 63 to switch contact 42. Switch contact 33 is connected through conductor 48 to contact segment 24 previously mentioned. Switch contact 43 is connected by conductor 64 to contact segment 29 and contact segment 28 is connected by conductor 65 to the commutator brush 6 of the dynamo electric machine. Switch contact 34 is connected through conductor 49 to a fixed contact 50 of an automatic switch for interrupting the charging circuit when the speed of the generator is below a predetermined speed or above a higher predetermined speed. The automatic switch includes a pivoted contact arm 51 operated by a centrifugal governor 52 which is operatively connected to the dynamo electric machine 3 or the crank shaft of the engine. Between predetermined generator speed limits the contact 51 coöperates with the contact 50, but above and below these limits, the circuit is broken at this point. The contact arm 51 is connected through a conductor 53 to commutator brush 6 of the dynamo electric machine. In the conductor 53 or at some other suitable point in the charging circuit, a switch 54 may be provided. The lighting circuit includes lamps 55 connected across conductors 56 and 57, conductor 56 being connected to switch contact 35, and conductor 57 being connected to the middle point of the entire battery. At a suitable point in the lighting circuit, as for example, in the conductor 57, a switch 58 is provided for controlling the lighting circuit. A signal device, such as the Klaxon horn 59, may be connected across the lighting circuit or across any suitable portion of the battery. The signal circuit is provided with switch 60 for controlling the same.

In Fig. 3 I have illustrated a modified arrangement of apparatus, in which the dynamo electric machine is located behind the engine, and in which the torque multiplying power transmission mechanism includes gear teeth 72 secured to the fly wheel 71 of the internal combustion engine. The rear wheels of the automobile are shown at 70 in this figure.

It will be understood that my improved system is suitably mounted upon an automobile. As is well known, the voltage of a storage battery decreases as the battery passes from fully charged condition to discharged condition, and I prefer to use lamps, the normal operating voltage of which is higher than the average voltage of a battery section. The reasons for this choice of lamps will appear hereinafter. This feature of my invention is claimed, however, in my prior application hereinbefore referred to.

The operation of my improved system is as follows:— Assume that the internal combustion engine is at rest and that it is desired to start it. The switch 32 is thrown into the position shown in the drawing, that is, with the contacts 33, 34 and 35 connected to contacts 36, 37 and 38 respectively. The lever 61 is then thrown into position to cause the clutch member 10 to engage and coöperate with the clutch member 11. Current now flows to the dynamo electric machine 3 through the following circuit:—from the right hand terminal of battery section 31, through conductor 45, conductor 64, contact segment 29, contact segment 23, contact segment 28, conductor 65, commutator brush 6, through the armature and shunt winding of the dynamo electric machine 3, to brush 5, conductor 66, contact segment 25, series winding 7, contact segment 24, conductor 48, switch contact 33, switch blade 39, switch contact 36, conductor 46, to the left hand terminal of storage battery section 30. It will be observed that the voltage of the entire battery is impressed upon the dynamo electric machine for operating the same as a motor, and also that when so operated the series winding of the dynamo electric machine is effective, thereby giving to the machine series characteristics, and consequently causing the motor to have large starting torque. Only a small portion of the current will flow through the shunt winding 8 at starting, and the effect of this is merely to strengthen the field somewhat. When thus operated as a motor, the dynamo electric machine is enabled through the torque multiplying train of gears 14, 15, 16 and 17 to rotate the crank shaft 2 of the engine 1 to a sufficient extent to cause the engine to start. After the engine has started, the lever 61 is permitted to return to its normal position, the clutch member 10 engages the clutch member 12 so that the dynamo electric machine 3 is driven as a generator from the engine, the series winding 7 is short circuited, and the charging circuit is closed at contacts 22 and 26. Furthermore, within proper generator speed limits for battery charging, the charging circuit is closed at contacts 50 and 51 by the centrifugal device 52. For the position of the switch 32 illustrated, the charging circuit may be traced as follows:—from brush 6 of the dynamo electric machine operating as a generator, through switch 54, conductor 53, contact arm 51, contact 50, conductor 49, switch contact 34, switch blade 40, switch contact 37, switch contact 42, conductor 63, contact segment 22, contact segment 26, conductor 47, storage battery section 30, conductor 46, swith contact 36, switch blade 39, switch contact 33, conductor 48, contact segment 24, contact segment 23, contact segment 25, conductor 66, to commutator brush 5. It is to be noted that under these circumstances, the dynamo electric machine 3 is operating as a shunt generator, the series winding 7 being short circuited. If for any reason it should be desired to relieve the engine of the charging load, switch 54 may be opened. For the position of switch 32 illustrated, and assuming that switch 58 is closed, current is supplied to the lamps 55 from battery section 31 through the following circuit:—from the right hand terminal of storage battery section 31, through conductor 45, switch contact 43, switch contact 38, switch blade 41, switch contact 35, conductor 56, lamps 55, conductor 57, switch 58, to the left hand terminal of battery section 31. It will be observed that the lamps are fed from a source of current of substantially constant voltage, namely, a storage battery section, and the lamps are not subjected to variations in generator voltage due to variations in speed. For the other closed position of switch 32, the battery section 31 is being charged, and the lights are being supplied from battery section, 30, the charging circuit being as follows:—starting from commutator brush 6, through switch 54, conductor 53, contact arm 51, contact 50, conductor 49, switch contact 34, switch blade 40, switch contact 43, conductor 45, storage battery section 31, conductor 47, contact segment 26, contact segment 22, conductor 63, switch contact 42, switch blade 39, switch contact 33, conductor 48, contact segment 24, contact segment 23, contact segment 25, conductor 66, to brush 5. At this time the lighting circuit is as follows:—from the right hand terminal of the storage battery section 30, through switch 58, conductor 57, lamps 55, conductor 56, switch contact 35, switch blade 41, switch contact 44, switch contact 36, conductor 46, to the left hand terminal of storage battery section 30. Obviously, the signal 59 may be operated by closing the switch 60 and ignition or other circuits may be supplied from the entire battery or any desired portion thereof. It will be noted that the voltage of the entire battery is available for operating the motor to start the engine, and that the switch 32 provides means for interchangeably connecting the dynamo electric machine acting as a generator and the lights to either section of the battery. I prefer to use lamps which have a voltage considerably higher than the average voltage of a battery section in discharging, so that the operator, in order to obtain a proper degree of illumination of the lamps, will be compelled to shift the switch 32 at intervals, thereby preventing any considerable variation in the degree of illumination of the lamps, and insuring keeping the batteries in a high condition of charge. The life of the lamps is prolonged because they are fed with current of a substantially constant voltage and are not subjected to the injurious effects of varying voltages.

Having now described my invention, what I claim as new therein and desire to protect by Letters Patent is as follows:—

1. In a system of the class described, the combination of an internal combustion engine, a dynamo electric machine adapted to operate as a motor to start said engine or as a generator driven by said engine, a storage battery, a lighting circuit, and means for connecting said lighting circuit to a section only of said battery and for connecting the whole of said battery to said machine to operate said machine as a motor or another section of said battery to said machine for charging said battery, said machine always being maintained out of said circuit, substantially as described.

2. In a system of the class described, the combination of an internal combustion engine, a dynamo electric machine adapted to operate as a motor to start said engine or as a generator driven by said engine, a storage battery, a lighting circuit, and means for connecting said lighting circuit to a section only of said battery and for connecting the whole of said battery to said machine to operate said machine as a motor or another section of said battery to said machine for charging said battery, the battery sections connected to said lighting circuit and said machine being interchangeable, said machine always being maintained out of said circuit, substantially as described.

3. In a system of the class described, the combination of an internal combustion engine, a storage battery comprising two sections, each consisting of the same number of cells, a dynamo electric machine capable of operating as a motor to start said engine or as a generator, lamps, and connections and circuit changing means for causing said machine to always be maintained out of the lamp circuit and for causing one section only of said battery to supply current to said lamps while the other section only is being charged from said machine operating as a generator or while current from the battery is being supplied to said machine to operate the same as a motor to start said engine, substantially as described.

4. In a system of the class described, the combination of an internal combustion engine, a dynamo electric machine adapted to operate as a motor with series characteristics to start said engine or as a generator with shunt characteristics to be driven by said engine, a storage battery, and means for connecting the whole of said battery to said machine to operate it as a motor with series characteristics or for connecting a section only of said battery to said machine whenever operating as a generator with shunt characteristics, substantially as described.

5. In a system of the class described, the combination of an internal combustion engine, a storage battery comprising two sections, each consisting of the same number of cells, a dynamo electric machine capable of operating as a motor with series characteristics to start said engine or as a generator with shunt characteristics, lamps, and connections and circuit changing means for causing said machine to be always maintained out of the lamp circuit and for causing one section only of said battery to supply current to said lamps while the other section only is being charged from said machine operating as a generator with shunt characteristics or while current from the battery is being supplied to said machine to operate the same as a motor with series characteristics to start said engine, substantially as described.

6. In apparatus of the class described, the combination of an internal combustion engine, a dynamo electric machine having a shunt winding and a normally short circuited series winding, a storage battery adapted to be connected to supply current to or receive current from said machine, power transmission mechanism normally operatively connecting said engine to said machine for driving said machine as a generator, torque multiplying power transmission mechanism adapted to connect operatively said machine to said engine to start the same, and means for rendering the first mentioned power transmission mechanism inoperative and the second mentioned power transmission mechanism operative and simultaneously rendering the series winding of said machine effective, substantially as described.

7. In combination, a dynamo electric machine capable of operating as a motor or as a generator, a storage battery in sections, a circuit containing a translating device, and means for causing said machine to be always maintained out of said circuit and for causing said circuit to be supplied with current from only one of said battery sections while another of said battery sections is being charged from said machine operating as a generator or while curent is being supplied from a plurality of said battery sections including the section supplying current to said circuit to operate said machine as a motor, substantially as described.

8. In combination, a dynamo electric machine having series and shunt windings, a storage battery in sections, a circuit containing a translating device, and means for causing said machine to be always maintained out of said circuit and for causing said circuit to be supplied with current from only one of said battery sections while another of said battery sections is being charged from the dynamo electric machine operating as a shunt generator or while current is being supplied from a plurality of said battery sections including the section supplying current to said circuit to said machine through its series windings to operate said machine as a motor, substantially as described.

9. In a system of the class described, the combination of an internal combustion engine, a dynamo electric machine capable of operating as a motor or as a generator and having series and shunt windings, power transmission mechanism including clutching means for connecting the machine to the engine to start the same or for connecting the engine to the machine to drive said machine as a generator according to the disposition of the clutching means, and a circuit-controlling switch for the machine having means for rendering the series winding of the machine effective or ineffective as desired, said clutching means and the movable member of said switch being mechanically connected, substantially as described.

10. In a system of the class described, an internal combustion engine, a dynamo electric machine capable of operating as a motor and as a generator and having series and shunt windings, and means for controlling the connection of the machine to the engine to start the latter and for controlling the connection of the engine to the machine to drive said machine as a generator, said means being adapted to effect the short circuiting of said series winding when said machine is connected to the engine to be driven as a generator, substantially as described.

11. In a system of the class described, an internal combustion engine, a dynamo electric machine capable of operating as a motor and as a generator and having series and shunt windings, and means for controlling the connection of the machine to the engine to start the latter and for controlling the connection of the engine to the machine to drive said machine as a generator, said means being adapted to effect the short circuiting of said series winding when said machine is connected to the engine to be driven as a generator, and said means being biased to a position for effecting the connection of the engine to the machine to drive the latter as a generator, substantially as described.

This specification signed and witnessed this 27th day of July, 1912.

THOS. A. EDISON.

Witnesses:
HENRY LANAHAN,
ANNA R. KLEHM.